(12) United States Patent
Burenga et al.

(10) Patent No.: US 10,584,462 B2
(45) Date of Patent: *Mar. 10, 2020

(54) ROCK BUCKET ATTACHMENT INCORPORATING SWEEP-IN GRAPPLE FOR PARTIAL OR FULL COLLECTION AND CONVEYING OF MISCELLANEOUS DEBRIS

(71) Applicants: Thomas I. Burenga, Litchfield, MO (US); Tim Burenga, Litchfield, MO (US)

(72) Inventors: Thomas I. Burenga, Litchfield, MO (US); Tim Burenga, Litchfield, MO (US)

(73) Assignee: Worksaver, Inc., Litchfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/932,541

(22) Filed: Mar. 13, 2018

(65) Prior Publication Data

US 2018/0245307 A1 Aug. 30, 2018

Related U.S. Application Data

(63) Continuation-in-part of application No. 14/999,087, filed on Mar. 29, 2016, now Pat. No. 10,066,360.
(Continued)

(51) Int. Cl.
*E02F 3/40* (2006.01)
*A01B 43/00* (2006.01)
(Continued)

(52) U.S. Cl.
CPC ............. *E02F 3/404* (2013.01); *A01B 43/00* (2013.01); *E02F 3/3663* (2013.01); *E02F 3/407* (2013.01); *E02F 7/06* (2013.01)

(58) Field of Classification Search
CPC ............ E02F 3/404; E02F 3/962; A01B 43/00
See application file for complete search history.

(56) References Cited

U.S. PATENT DOCUMENTS 3,152,706 A * 10/1964 Conrad ..................... B66C 1/68
                                                     294/104
3,250,028 A *  5/1966 Hunger .................. E02F 3/404
                                                     37/406
(Continued)

OTHER PUBLICATIONS

2012 Loftness Specialized Equipment, Inc, Loftness Commercial Equiment, Loftness Kwik Pik, Printed May 2012,Hector, MN 55342 USA.
(Continued)

*Primary Examiner* — Jamie L McGowan
(74) *Attorney, Agent, or Firm* — Paul M. Denk

(57) ABSTRACT

A rock bucket attachment for securement with a skid steer unit or tractor front loader, the attachment incorporating a bucket for use in combination with a grapple, the bucket having side walls, back walls, and a bottom wall, at least one pair of grapples interconnecting by lever arms to the side walls of the bucket, said at least one pair of grapples having a pair of side arms pivotally connected with the front of the lever arms, and hydraulic cylinders interconnecting between the back of the side arms and the back end of the side walls, or the frame structure interconnecting between the two, such that when the hydraulic cylinders are actuated, they initially pivot the lever arms forwardly to their fullest extent to arrange the grapples and its rake over a debris pile, and then further actuation of the hydraulic cylinders pivoting the side arms relative to the lever arms to pivot the rake of each grapple downwardly to urge any debris onto the bucket as the rake comes into proximity with the front of the bucket,
(Continued)

to retain any raked debris therein. There are at least a pair or more of grapples operatively associated with the rock bucket attachment.

11 Claims, 9 Drawing Sheets

Related U.S. Application Data

(60) Provisional application No. 62/601,307, filed on Mar. 17, 2017, provisional application No. 62/177,920, filed on Mar. 27, 2015.

(51) Int. Cl.
  *E02F 3/36* (2006.01)
  *E02F 7/06* (2006.01)
  *E02F 3/407* (2006.01)

(56) References Cited

U.S. PATENT DOCUMENTS

| | | | |
|---|---|---|---|
| 3,477,602 A * | 11/1969 | Peterson | E02F 3/404 414/704 |
| 3,485,396 A * | 12/1969 | Lundquist | B60P 1/50 294/201 |
| 3,669,293 A * | 6/1972 | Bryan | B60P 1/48 294/104 |
| 4,266,906 A | 5/1981 | Langenfeld et al. | |
| 4,266,909 A | 5/1981 | Langenfeld et al. | |
| 4,283,866 A | 8/1981 | Ogawa | |
| 4,285,628 A * | 8/1981 | Jankowski | E02F 3/404 37/406 |
| 4,296,818 A | 10/1981 | Malinowski et al. | |
| 4,367,062 A | 1/1983 | Duenow | |
| 4,372,063 A * | 2/1983 | Work | A01G 23/093 37/301 |
| 4,411,573 A | 10/1983 | Townsend | |
| 4,606,692 A | 8/1986 | Langenfeld et al. | |
| 4,621,973 A | 11/1986 | Langenfeld et al. | |
| 4,753,568 A | 6/1988 | Langenfeld et al. | |
| 4,797,051 A | 1/1989 | Langenfeld et al. | |
| 4,887,939 A | 12/1989 | Langenfeld et al. | |
| RE33,198 E | 4/1990 | Ballinger | |
| 4,915,575 A | 4/1990 | Langenfeld et al. | |
| 4,925,359 A * | 5/1990 | Dunnegan | E02F 3/404 414/704 |
| 5,060,732 A * | 10/1991 | Baskett | A01B 33/021 171/19 |
| 5,171,124 A | 12/1992 | Foster | |
| D332,271 S * | 1/1993 | DuBose | D15/32 |
| 5,564,885 A * | 10/1996 | Staben, Jr. | E02F 3/3631 37/403 |
| 5,639,205 A * | 6/1997 | Kaczmarczyk | A01B 43/00 37/406 |
| 5,682,953 A | 11/1997 | Buysse | |
| 5,957,650 A * | 9/1999 | Rollo | E02F 3/404 37/406 |
| 6,074,160 A * | 6/2000 | Brumbaugh | E02F 3/3609 37/903 |
| 6,109,859 A * | 8/2000 | Domann | B66F 9/065 294/67.22 |
| 6,267,547 B1 * | 7/2001 | Lund | B66F 9/065 294/68.1 |
| 6,287,072 B1 * | 9/2001 | Wasilas | E02F 3/404 37/406 |
| 6,357,993 B1 * | 3/2002 | Burton | E02F 3/34 37/406 |
| 6,374,520 B1 | 4/2002 | Westendorf et al. | |
| 6,526,678 B2 * | 3/2003 | Waddington, Jr. | E02F 3/404 172/811 |
| 6,582,177 B1 | 6/2003 | Westendorf et al. | |
| 6,663,337 B2 | 12/2003 | Westendorf et al. | |
| 6,820,357 B1 * | 11/2004 | Menard | A01B 43/00 294/201 |
| D507,004 S | 7/2005 | Westendorf et al. | |
| 6,939,099 B1 * | 9/2005 | Stokkeland | E02F 3/3627 37/406 |
| 6,986,634 B2 | 1/2006 | Westendorf et al. | |
| 6,994,511 B2 | 2/2006 | Westendorf et al. | |
| 6,994,512 B2 | 2/2006 | Stender et al. | |
| 7,008,162 B2 | 3/2006 | Westendorf et al. | |
| 7,014,411 B2 | 3/2006 | Westendorf et al. | |
| 7,241,101 B2 * | 7/2007 | Bauer | A01F 25/2027 414/726 |
| 7,326,026 B2 | 2/2008 | Stender et al. | |
| 7,431,554 B2 * | 10/2008 | Westendorf | B66C 1/585 294/201 |
| 7,559,962 B2 | 7/2009 | Miller | |
| 7,631,446 B1 * | 12/2009 | Davis | E02F 3/3405 37/444 |
| 8,069,591 B2 * | 12/2011 | Dunn | A01D 87/0076 37/406 |
| 8,109,709 B1 * | 2/2012 | Gaetze | E02F 3/404 37/406 |
| 8,287,226 B1 | 10/2012 | Westendorf et al. | |
| D686,250 S | 7/2013 | Harter | |
| 8,615,907 B2 * | 12/2013 | Miller | E02F 3/404 172/615 |
| 8,695,239 B2 * | 4/2014 | Seda | E02F 3/96 37/406 |
| 9,611,618 B2 * | 4/2017 | Miller | E02F 3/404 |
| 10,066,360 B2 * | 9/2018 | Burenga | E02F 3/404 |
| 2002/0044862 A1 * | 4/2002 | Burton | E02F 3/34 414/724 |
| 2004/0126217 A1 | 7/2004 | Westendorf et al. | |
| 2005/0172795 A1 | 8/2005 | Westendorf et al. | |
| 2006/0182592 A1 | 8/2006 | Stender et al. | |
| 2006/0182593 A1 | 8/2006 | Westendorf et al. | |
| 2009/0211121 A1 * | 8/2009 | Doster, Jr. | E02F 3/404 37/468 |
| 2011/0318158 A1 * | 12/2011 | Miller | E02F 3/404 414/722 |
| 2013/0042507 A1 * | 2/2013 | Seda | E02F 3/404 37/406 |
| 2016/0340862 A1 * | 11/2016 | Miller | E02F 3/404 |

OTHER PUBLICATIONS

2011 Remlinger Mfg. Co., PFM Product Series 570 & 571 Tine Rock Bucket, Series 500-55, Multi-Purpose Fork Bucket, Series 500 Hydraulic Powered Rock Picker.
Westendorf Mfg. Co., Inc., 2008 Cat Claw 3D Grab Fork, p. 37, 110-111; 2009 Freedom Mount, p. 82; XTA Series, p. 62.

* cited by examiner

ROCK BUCKET ATTACHMENT INCORPORATING SWEEP-IN GRAPPLE FOR PARTIAL OR FULL COLLECTION AND CONVEYING OF MISCELLANEOUS DEBRIS

CROSS REFERENCE TO RELATED APPLICATION

This nonprovisional patent application claims priority to the provisional patent application having Ser. No. 62/601,307, filed on Mar. 17, 2017, which claims priority to the non provisional patent application having Ser. No. 14/999,087, filed on Mar. 29, 2016, which claims priority to the provisional patent application having Ser. No. 62/177,920, filed on Mar. 27, 2015.

FIELD OF INVENTION

This invention generally relates to a bucket attachment for pickup and conveyance of miscellaneous debris, but more specifically pertains to a modified bucket, as an accessory attachment to a tractor, that has both pickup features and grapple applications for loading rock, miscellaneous larger debris, even logs and tree trunks, for movement to another location for disposal, fill, or for other uses. The grapple for this modified design may extend partially across the bucket, or fully across the bucket, or be formed in two or more sections that extend partially across the bucket when assembled.

BACKGROUND OF THE INVENTION

This invention relates to a grapple attachment for application to a skid steer, small tractor, or other form or construction implement.

There are numerous tractor attachments that have been available in the prior art. Some of them even include grapple means, for use for picking up rock, or other debris. For example, there are attachments for skid steer loader buckets, and rock blocking attachments, as can be seen in U.S. Pat. No. D686,250.

A construction bucket that includes a bucket, in addition to an attachable blade, that is hydraulically operated for the movement of dirt, and the like, is shown in U.S. Pat. No. 7,631,446.

An apparatus for on-site cleaning for landscape rock can be seen in the U.S. Pat. No. 7,559,962. A device that is mounted onto the front of loaders or tractors and for use for picking up and separating rock, by use of the reel type of sweep, can be seen in the U.S. patent to Buysse, U.S. Pat. No. 5,682,953.

A back hoe attachment for skid steer loader, and which can be used for digging dirt, and the like, can be seen in the U.S. patent to Foster, U.S. Pat. No. 5,171,124.

A cylinder-type ground-raking attachment for a bucket-equipped tractor can be seen in the U.S. Pat. No. 5,060,732, to Baskett.

The Pat. No. RE. 33,198, to Ballinger, shows a strata rock bucket.

A rotary rock picker that incorporates a fork and reel assembly, and a stone bucket, can be seen in the U.S. patent to Malinowski, et al, U.S. Pat. No. 4,296,818.

A convertible bucket attachment that is capable of excavation and clasping of debris or other ground materials, can be seen in the United States patent to Ogawa, U.S. Pat. No. 4,283,866.

There are many commercial uses of existing rock buckets that are on the market. These usually do attach to skid steer units, tractor front loaders, and even some wheel loaders. Some even include some clamp-type grapples, but many of them do not. The clamp-type grapple will help secure rocks and other debris within its associated bucket.

A Remlinger Manufacturing Company, Inc., of Kalida, Ohio, has a tine rock bucket for attachment to a skid steer, but the grapple type means for aiding in the loading of the formed bucket simply functions as a sweep, and through its pivot, helps to push rocks onto the associated bucket. It includes a singular pivot of its rake for attempting to move rocks onto its bucket tines.

A company named Loftness, has marketed a commercial-agricultural rock picker for skid steers and bidirectional tractors. This device also has a singular pivot rake-type mechanism for pushing rocks, boulders, and other debris onto its bucket.

Another product of the Loftness Specialized Equipment Company, of Hector, Minn., is a skid steer attachment that attempts to dig into the soil beneath the rocks in order to attempt to achieve their pickup.

Another company by the name of Blue Diamond Attachments, of Knoxville, Tenn., shows a bucket with a singular pivot grapple means that attempts to hold the rocks and debris onto the bucket, once the bucket has dug underneath the rocks in preparation for their loading.

Horst Welding, of Listowel, Ontario, Canada, builds and markets a conventional rock bucket that has an optional hydraulic reel that rakes usually small rocks into the implements bucket. These are examples of the commercial type products that are available, and which are for the pickup of rocks and other debris, some of which incorporate sweep arms, or reel sweeps, for attempting to load smaller rocks onto their buckets.

This is all shown in the prior art.

SUMMARY OF THE INVENTION

This invention relates to a new and improved type of rock bucket that has hydraulically operated grapple means, which can be maneuvered into a compound pivot for initially locating the grapple on the front side of any large rock, boulders, or even a tree stump, through a first pivotal motion, and then further pivoting the grapple to arrange it in frontal contact with such debris, and through further pivoting, push such rocks onto the implement bucket, for conveyance to another location. The invention is very useful for providing a total cleanup of a rock, boulder, and other debris laden areas, through the use of this implement that fully maneuvers such debris onto the implement bucket, and retain it there, during its conveyance. The structural essence of this invention includes a rock bucket attachment that incorporates a sweep-in grapple at its upper frontal portion, and useful for picking up rock, boulders, even logs and tree trunks, during usage. It includes a bucket, the bucket being formed of a solid plate, or a series of spaced apart bars, or even tubular tines, that form a bottom support for the formed bucket. When the spaced apart bars or tines are used, this allows for smaller dirt and rocks to fall through the bucket, while the larger rocks and boulders can be conveyed through its usage.

The bucket has a pair of sidewalls, and these sidewalls likewise may be slotted, to allow any debris to pass therethrough, or the front of the sidewalls may have some arcuateness, to allow for a log or tree trunk to be picked up upon the frontal bars or tines of the bucket bottom, and be held in position there against, in its cutout segment, through use of the grapple, so that the logs can be conveyed to a different location, as during cleanup.

There is a back wall that attaches with the sidewalls of the bucket, and the bottom wall of the bucket, as aforesaid, connects with the approximate bottom of the back wall particularly to hold the parallel bars and tines in fixed position, at the back location of the bucket, while the front of the bars and tines are held by a crossbar that is provided between the lower front of the sidewalls, and useful for securing the front of the bottom wall therewith. There is also an upper frame that connects between the approximate upper back of the side walls, to add structural integrity to the bucket when formed.

Cooperating with the bucket is its grapple. The grapple incorporates a pair of spaced apart side arms, and has a structured rake or grapple provided affixed between the frontal part of said pair of side arms, and the grapple also includes a pair of lever arms, each being pivotally connecting with a side arm, at the front of the lever arms, while the opposite end of each lever arm is pivotally connected with the approximate upper back of each side wall. There is at least one hydraulic cylinder that extends between one of the side walls, or the upper frame of the approximate back of the bucket, and the hydraulic cylinder at its other end connects with the approximate back of at least one of the side arms, such that when the hydraulic cylinder is actuated, initiating first the forward movement of the grapple, and then upon further actuation of the hydraulic cylinder, pivoting the grapple and its rake into contiguity with the front of the bottom wall to rake in and pick up any rock or other debris from the ground.

In addition, the structural rake of the grapple is pivotally connected through its pair of side arms to the pair of lever arms, and this is achieved through a cross rod that extends between the approximate front of the pair of lever arms, and a second cross rod interconnects between the approximate back of the pair of side arms, and a spring means interconnects between the first and second cross rods. Thus, as the hydraulic cylinder extends the grapple forwardly, through its extension and forcing a pivoting downwardly of the lever arms, until they reach their fullest pivotal extent, any further forcement through the extension of the hydraulic cylinder overcomes the force of the spring means, and continues a further pivoting of the rake as the force of the hydraulic cylinder overcomes the compression of the spring means, and further pivots the pair of arms relative to the lever arms that pivots the rake downwardly, into proximity with the front of the bucket, and thereby forces any rocks, boulders, or other debris, into the bucket, and holds it there during conveyance.

It is also within the design of this rock bucket attachment that the grapple, of one structure, or more than one, may be designed for connecting with the back structure of the bucket, and extend only partially across the same, so that it can be used, at one end, or the opposite end, or even arranged in the middle, for use for pick up of only smaller bundles of debris, such as when handling brush, limbs, logs, or other related debris, or even when picking up rocks. For example, there may be a grapple portion that extends over one half of the bucket. Or, there may be two grapple portions that each extends over half of the bucket. Or, there may be a grapple portion that locates only in the middle of the bucket. Or, it is likely that the grapple sections may be about one third of the width of the bucket, and provide three different sections of grapple for picking up the foregoing type of debris. Obviously, the number of grapples will be at the desire of the customer for the design. Obviously, more than two or three grapple sections may be employed.

This essentially summarizes the concept of the structure that makes up the bucket and sweep-in grapple of this invention.

It is, therefore, the principal object of this invention to provide a rock bucket that can pick up, and through its grapple, hold various rocks, boulders and other debris within its bucket, for secure conveyance.

Another object of this invention is to provide a bucket attachment incorporating a sweep-in grapple that undertakes a pair of pivotal movements, initially advancing the grapple and its rake forwardly, to overlie any rocks or other debris, and then further pivoting of the rake downwardly and towards the front of the bucket in order to sweep such rock therein, and to hold it during its conveyance.

Yet another object of this invention is to provide a cooperation between hydraulic cylinder(s) and a spring means, that allows for the selective pivoting of the grapple, and its rake, in order to attain that sweep-in feature that draws in and holds debris within the attachment bucket, during usage.

Yet another object of this invention is to provide a bucket and grapple formed of various integrated bucket surfaces, back walls, side walls, lever arms, and side arms, all which pivotally cooperate with each other to achieve the sweep-in feature of the grapple during its pick up and conveyance of miscellaneous debris.

Still another object of this invention is to provide a bucket with sweep-in grapple which is designed to accommodate the pick up and hold logs, and secure them with respect to the bucket as they are conveyed to a different location.

Another object of this invention is to provide side walls for a bucket that incorporates arcuateness in order to facilitate and accommodate the locating of a large log therein, during its conveyance to a different place.

As previously reviewed, it is a further object of this invention to provide a rock bucket attachment for pick up of miscellaneous debris, and wherein its grapple sections may be formed for extending over only a part of the bucket, and there may be more than one such grapple section employed for usage in combination with the bucket for partial or selective pick up of debris and trash, by that portion of the bucket operatively associated therewith.

These and other objects may become more apparent to those skilled in the art upon review of the summary of the invention as provided herein, and upon undertaking a study of the description of its preferred embodiments, in view of the drawings.

DESCRIPTION OF THE PREFERRED EMBODIMENT

The concept of this invention is to provide a rock bucket attachment that incorporates a sweep-in grapple for conveying miscellaneous debris such as rocks and boulders. While the bucket of this invention is designed to mainly pick up rocks, however, it has also been found very handy to handle brush, logs, some tree stumps, and other debris that needs to be removed. It incorporates a hydraulically operated grapple that will actually "sweep" the rocks into the bucket, during its application.

Figure 1:
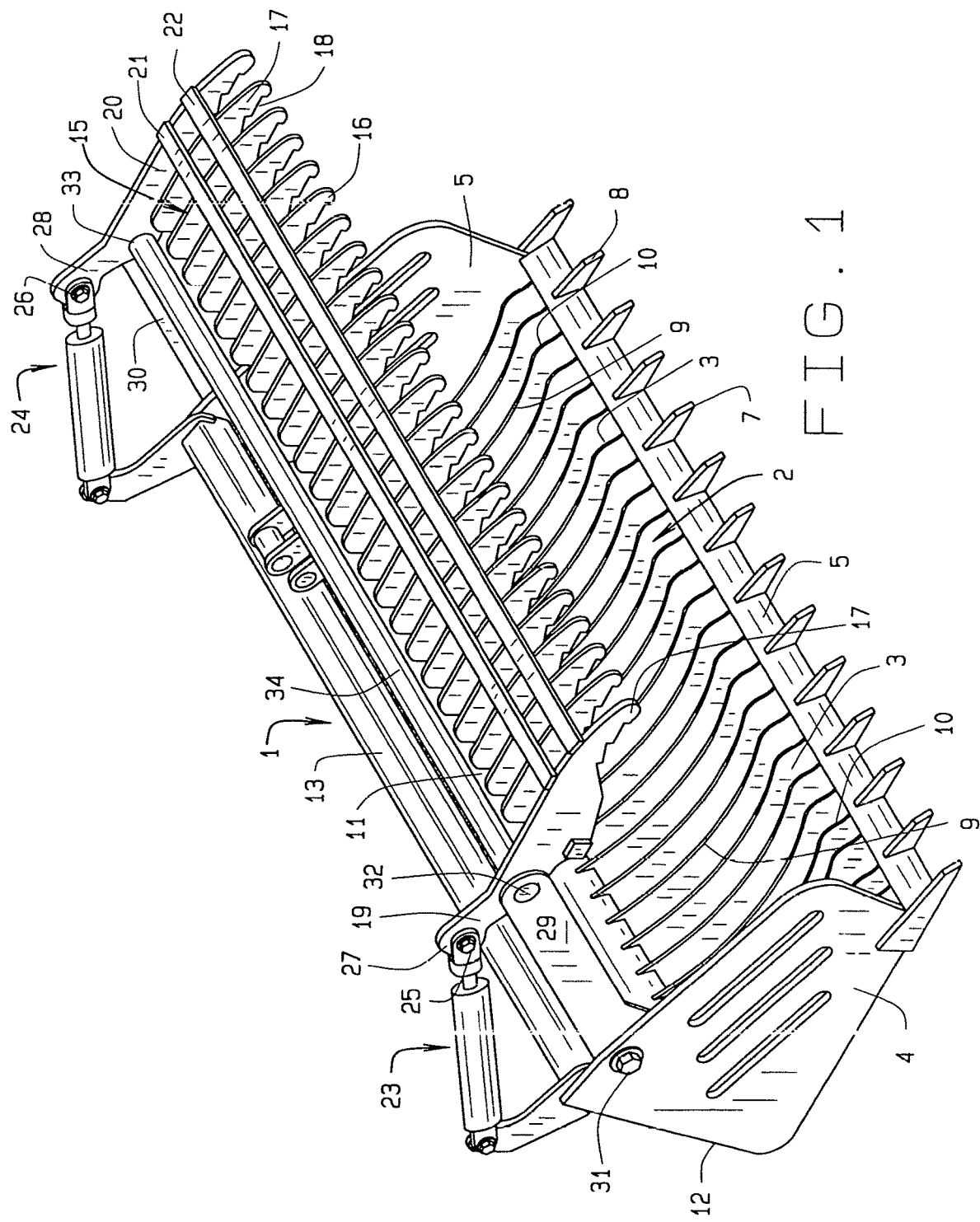
FIG. 1 is an isometric view of the rock bucket attachment incorporating sweep-in grapple of this invention, in its fully opened mode.

In referring to the drawings, and in particular FIG. 1, therein is shown the bucket and grapple 1 of this invention. Generally, it includes its bucket portion 2, which forms the base of the bucket, and this can be formed of either solid metal, or a series of horizontally spaced but parallel arranged bars 3 as can be noted. The bars, at their front edge, are maintained stable between the bucket side walls 4 and 5, through the use of a cross bar 6 that secures the bottom wall bars 3 in place, as shown. The bottom bars 3 may extend forwardly, or have forwardly extending segments 7 extending in front of the cross bar 6, and these front extensions are slightly beveled, as can be seen at 8, so as to allow for any rocks and debris to ride up onto said bars, as the bucket is used to provide for their conveyance. As can be noted, the bars 3 have slight concavity, as at 9, so that when rocks or other debris are loaded onto the bottom wall of the bucket, they will remain stabilized upon the bottom, and not slide off, once in place. It can also be seen that the parallel bars 3 have a slight upward contour, as at 10, and this also is provided so as to assure that any rocks or boulders that are urged onto the bottom wall, will remain in place, and not slide forwardly during conveyance.

There is a back wall 11 provided between the back edges 12 of the side walls, and this also is helpful for holding the debris upon the bottom wall, and keep it from sliding rearwardly out of the bucket, particularly during conveyance.

The benefit of utilizing the series of parallel bars 9 in the construction of the bottom wall of the bucket, over a solid bottom wall, is that when rocks and debris are picked up by the bucket, upon its forward movement either at the surface or slightly below ground, the bigger rocks that have a diameter greater than the distance between the bars 9, will remain in the bucket, while smaller rocks, pebbles, and dirt, will fall through the bottom wall, and back onto the surface of the ground, as desired. But, in the construction of this bucket and grapple, a solid bottom wall is of consideration, and part of the concept of this invention, although the parallel bars may be preferable. And, other modifications to the bottom wall of the bucket are also considered, as will be subsequently described.

Figure 4:
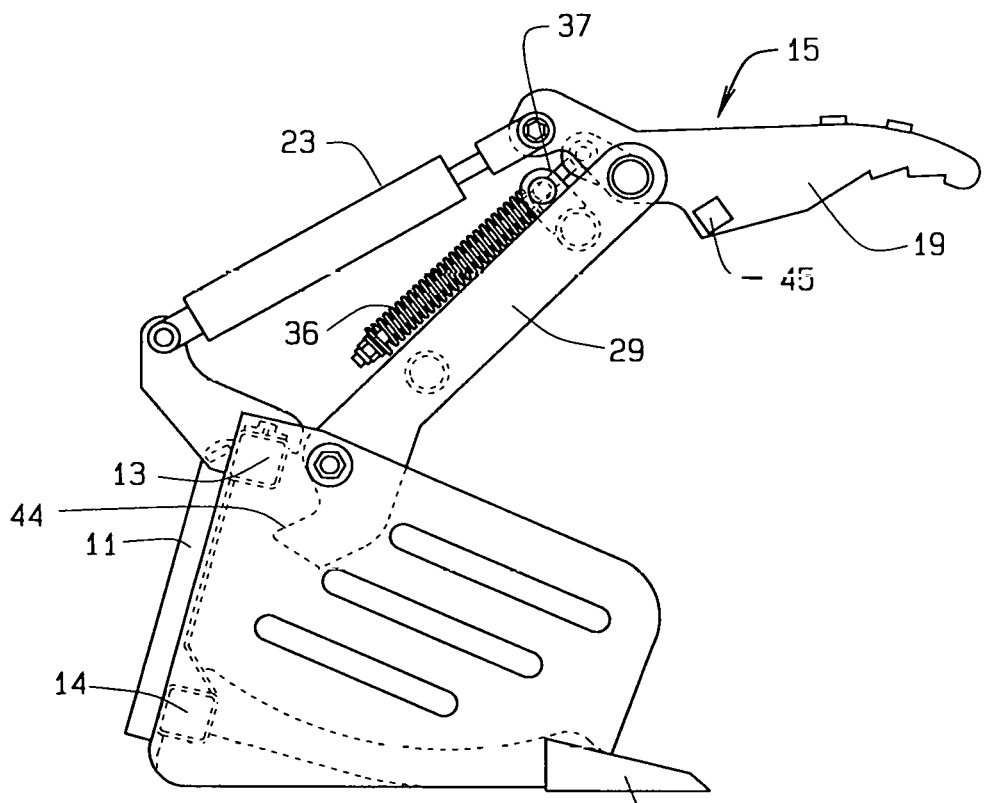
FIG. 4 provides a side view of the bucket and grapple, fully elevated, so as to allow the bucket and its lower front edge to come into contact with any debris to be removed.

The back wall 11 as can be seen in FIG. 4, includes an upper structured frame 13, generally formed as a square tube, and the bottom of the back wall includes a lower structured frame 14 securing between the side walls 4 and 5, in order to reinforce the integral structure of the entire bucket, when assembled. The back wall 11 may be a solid plate, or it may be formed as a screen, with the function being to retain any rocks or debris that have been scooped into the bucket during their conveyance, and prevent any such debris from falling off the back of the bucket, during conveyance.

As can also be seen in FIG. 1, there is the grapple structure 15 for the assembly. This grapple structure includes a frontal rake-like member 16 also made up of a series of forwardly extending bars 17, parallel arranged, as can be noted. The bars of this rake are slightly serrated, as noted at 18, and are provided for gripping upon any rocks or debris as it sweeps such into it upon the bottom of the bucket, during operation. There are a pair of side arms 19 and 20 structured at the sides of the grapple, and a series of cross bracing 21 and 22 extend between the side arms, and are structured to hold the grapple bars 16 in place. These side arms cooperate with at least one hydraulic cylinder, in this particular embodiment, comprising a pair of hydraulic cylinders 23 and 24, as can be noted. The hydraulic cylinders are pivotally connected, as at 25 and 26, respectively, proximate the back ends of the side arms 19 and 20, as can be seen at 27 and 28.

Figure 2:
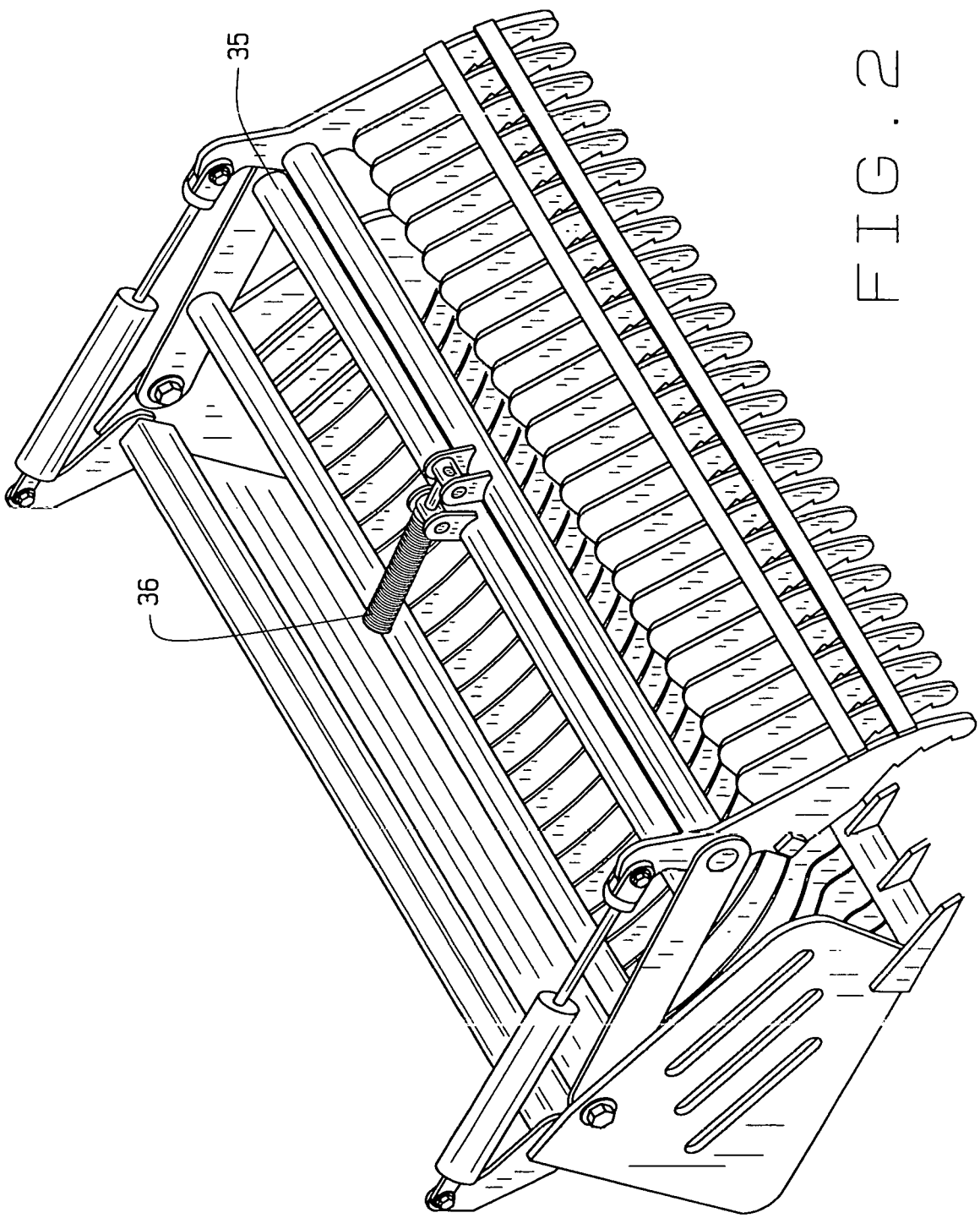
FIG. 2 provides an isometric view of the bucket and grapple of this invention with the hydraulic cylinders having pivoted the grapple to its forward most position, without any further downward pivot made of its rake system.
Figure 3:
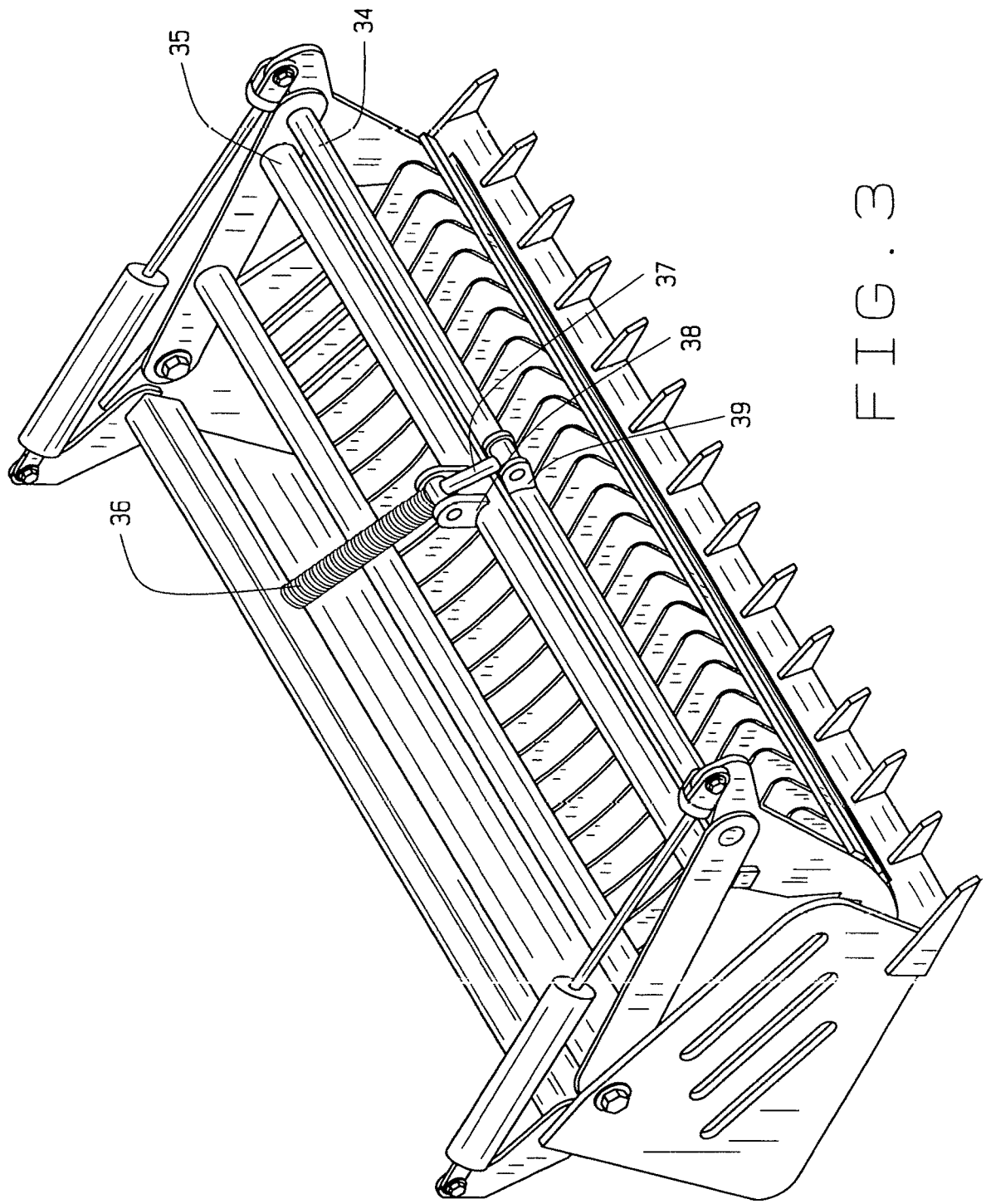
FIG. 3 shows the bucket and grapple of this invention, with the hydraulic cylinders fully extended, overcoming the pressure of the associated compression spring, for pivoting the rake of the grapple into proximity with the front edge of the bucket to sweep in and retain rocks or other debris within the same.

There are a pair of lever arms 29 and 30, and these lever arms, at their back ends, are pivotally secured to the side walls, as noted at 31. A similar type pivotal connection is made at the other side of the grapple, at the back end of the lever arm 30. The frontal or upper edges of the lever arms 29 and 30 are pivotally connected with the side arms 19 and 20, as can be seen at 32 and 33. And, a first cross rod 34 interconnects between the side arms, and the lever arms, to add structural integrity to this interconnection of these operative components. In addition, there is a second cross rod 35 that extends between the approximate front of the lever arms 29 and 30, as can be noted in FIG. 2. A spring means 36 is secured upon a rod 37, and extends through a pivot hub 38, as can also be noted in FIG. 3. The spring means 36 is secured on a rearward extension of the rod 37, and the rod extends to the back end of the spring means, and is affixed at that location. The pivot hub 38 is secured onto the second cross rod 35. A second pivot hub 39 secures onto the first cross rod 34, and that pivot hub connects the front end of the rod 37 thereto.

Figure 5:
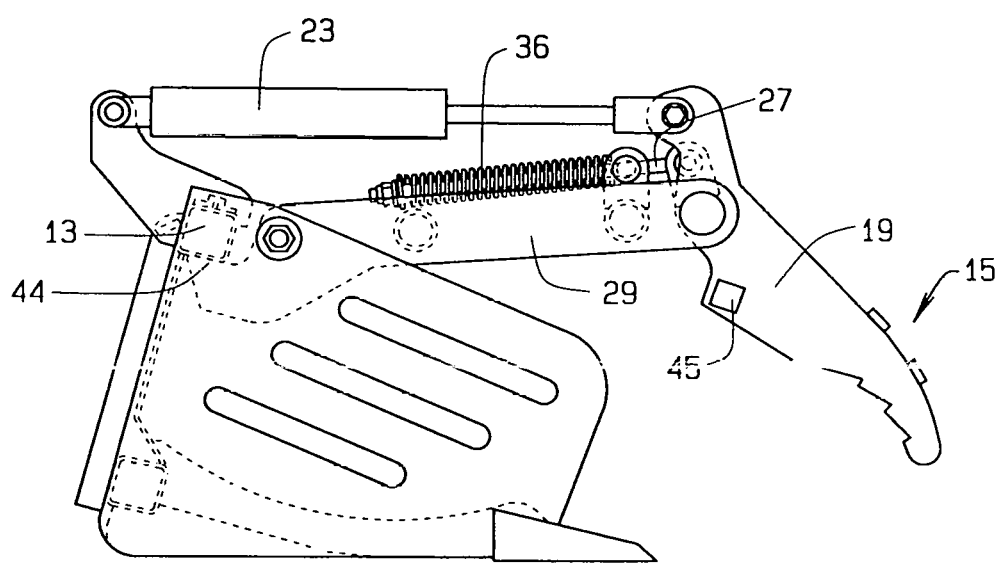
FIG. 5 is a side view of the bucket and grapple generally in the position as noted in FIG. 2, where the grapple is pivoted fully forwardly, but its rake has not been pivoted downwardly into its sweep-in mode.
Figure 6:
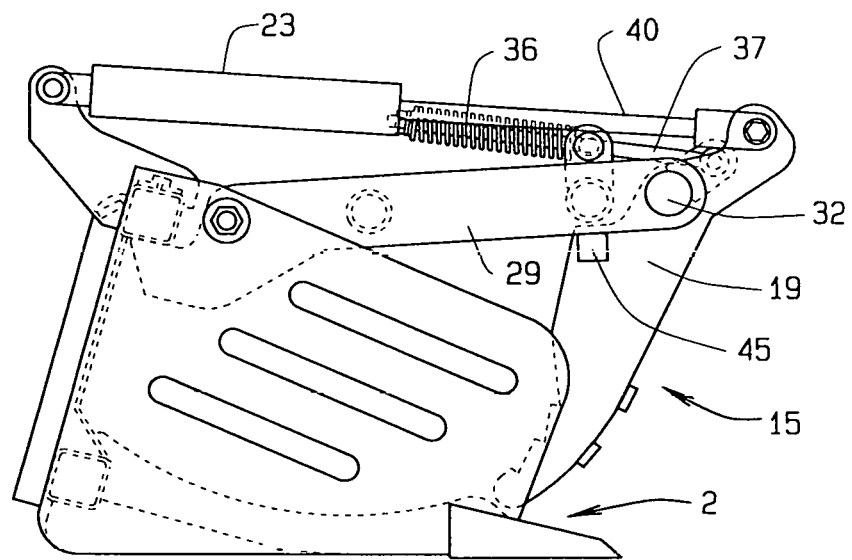
FIG. 6 is a side view of the bucket and grapple generally as shown in FIG. 3, where the grapple rake has been pivoted fully downwardly by means of the hydraulic cylinders to sweep in any rock and debris into the bucket and to secure such therein during conveyance.

Thus, as can be noted in the various FIGS. 4-6, and particularly in FIG. 4, when the bucket 2 is in position, level with the ground, and the skid steer or tractor moves forwardly, it will pile up rocks along its frontal edge. Or, if there is already a pile of rocks in the field, the front edge of the bucket will encounter the rock pile, and even dig slightly into the ground, to get under the same. During this segment of usage of this device, the grapple means 15 will be fully elevated, through a contraction of its hydraulic cylinders 23 and 24, as can be noted. In addition, its lever arms, as at 29, will be fully elevated, and the side walls 19 of the rake means, of the grapple, will be fully elevated, as noted. In this instance, the rod 37 of the spring means 36 will be contracted within its noted spring, so that the entire assembly of the grapple means 15 is completely elevated, in the manner as shown in FIG. 4. Thus, the skid steer or tractor is free to move forwardly, with complete clearance, so as to drive its forwardly extending blades 7 into the rock pile, or the like.

As can be noted in FIG. 5, the hydraulic cylinder 23, in addition to its companion cylinder 24 on the other side of the bucket, have been extended, as can be noted, and in doing so, pivots the various side arms, such as 19, along with the lever arm 29, to a forward most extent, which brings the rake 15 to an approximate midpoint of its pivot downwardly. At this juncture, the rod 37 is still located basically within its spring means 36, which in this instance, is a compression spring, but the lever arms 29 and 30 have reached their forward most extent of their pivot, being almost parallel with the ground, as can be noted in said FIG. 5. In this position, the rake 15 may encounter some of the debris, rocks, or even boulders, in preparation for its sweep motion as to be subsequently described. As noted in FIG. 6, when the hydraulic cylinders, such as 23 continue their extension of their hydraulical arm or ram 40, it can be seen that the spring means 36 compresses upon its rod 37 with the hydraulics overcoming the compression of the spring 36, to continue the forward pivot of the proximate side arm 19 about the pivot points 32 and 33 to sweep the rake 15 into proximity with the front of the bucket 2, thereby raking the debris, rocks, and boulders onto the bucket, as can be readily understood. The rake 15 may be held in that position, as the bucket is raised upon its skid steer, for conveying of the rock or boulders to another location, for discharge. Thus, as can readily be understood from a review of the motions undertaken by the various components that make up the grapple of this device, including its rake means 15, there are select and compound motions that are made by the rake 15, through the interconnection of its various arms 19 and 20, in addition to the lever arms 29 and 30, through the actuation of the hydraulic cylinders 23 and 24, that lead to an initial forward movement of the grapple 15 to its forward most extent, as noted in FIG. 5, and when the hydraulics overcome the compression of the spring 36, forces the rake means 15 into a sweeping motion for shoving the rocks and debris onto the bucket 2, during its operations. Thus, there is a compound motion that is achieved through the usage of the various interconnected components of this apparatus, that allows for the selective placement of the rake means, first at an elevated position, above any rock pile, as noted in FIG. 4, then its pivots into a lowered position that may contact the upper surface of the rock pile, as in FIG. 5, and finally, upon full actuation of the hydraulic cylinders, urging the rake means into its sweeping position, as noted in FIG. 6.

In practice, it has been found that hydraulic cylinders that can exert a pressure in the vicinity of 3,000 pounds of force, are adequate for functioning of the sweep means of this invention, during its operations. Obviously, the force of the compression springs that may be used will be of a lesser force, somewhere in the range of 2,000 pounds, in order to achieve this compounding of forces to move the rake of the grapple into its various positions, during functioning to remove a rock pile or other debris from a field.

Figure 7:
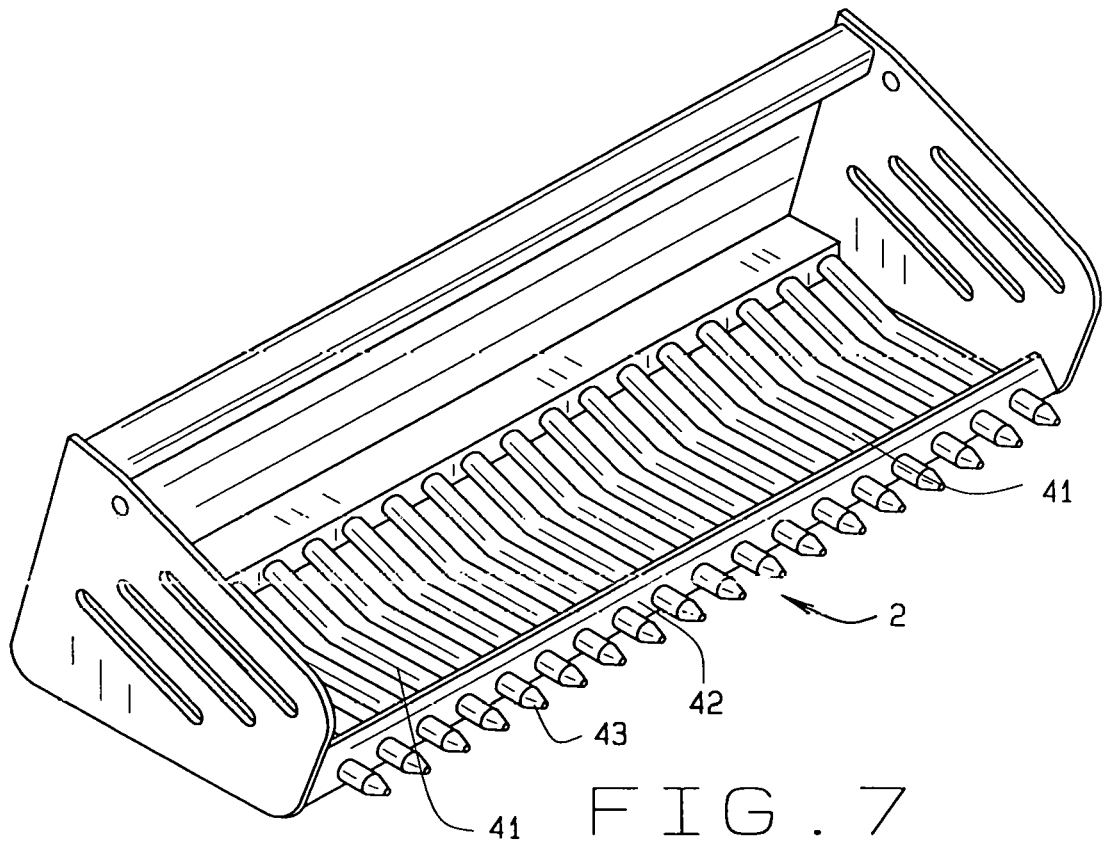
FIG. 7 shows a modification to the bucket, disclosing the use of supported tines forming the bottom of the disclosed bucket.
Figure 8:
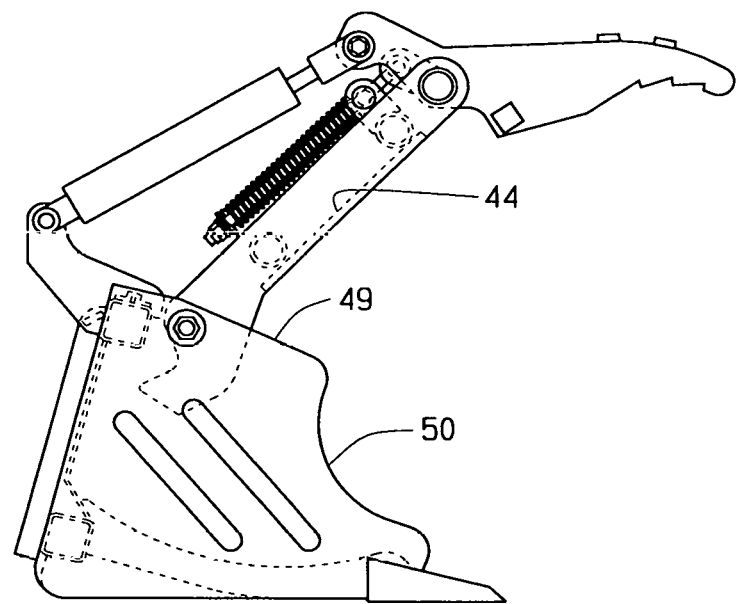
FIG. 8 shows an isometric view of a modification to the bucket and grapple fabricated for also conveying logs.

There are various other modifications to this invention that are considered. For example, in FIG. 7, it is to be noted that the bucket 2 in this particular instance, instead of utilizing parallel bars, such as the bars 3, in the formation of the bucket bottom, in this instance, a series of cylindrical tines, as at 41, may be employed. In addition, the tines may extend for some distance in front of their cross frame 42 and exhibit their pointed forward ends 43 to facilitate the pick up of any rock or debris during usage. This forward extension may be in the range of approximately four inches, in the preferred embodiment. Obviously, other dimensions may be useful. The tines may be an inch or two apart.

Figure 9:
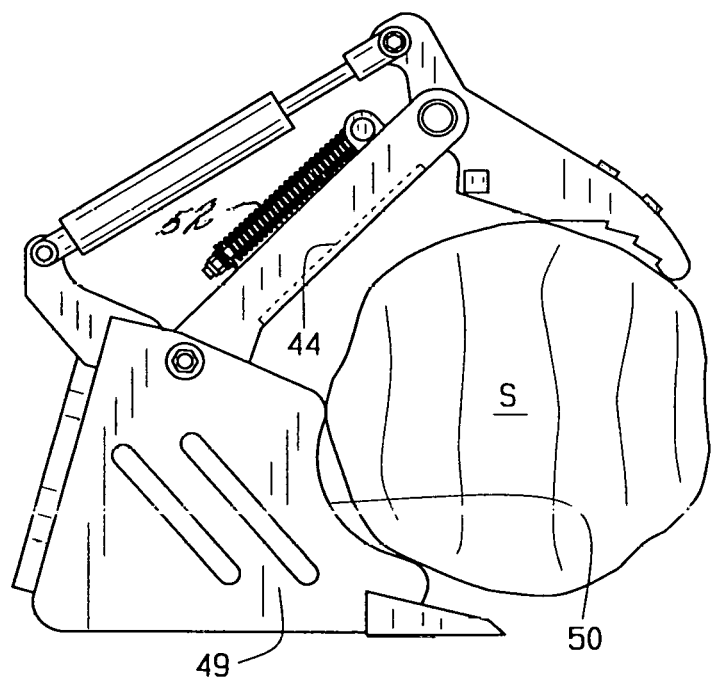
FIG. 9 shows a side view, disclosing how the bucket and grapple can combine to secure a sizeable log in position in preparation for its conveyance.
Figure 10:
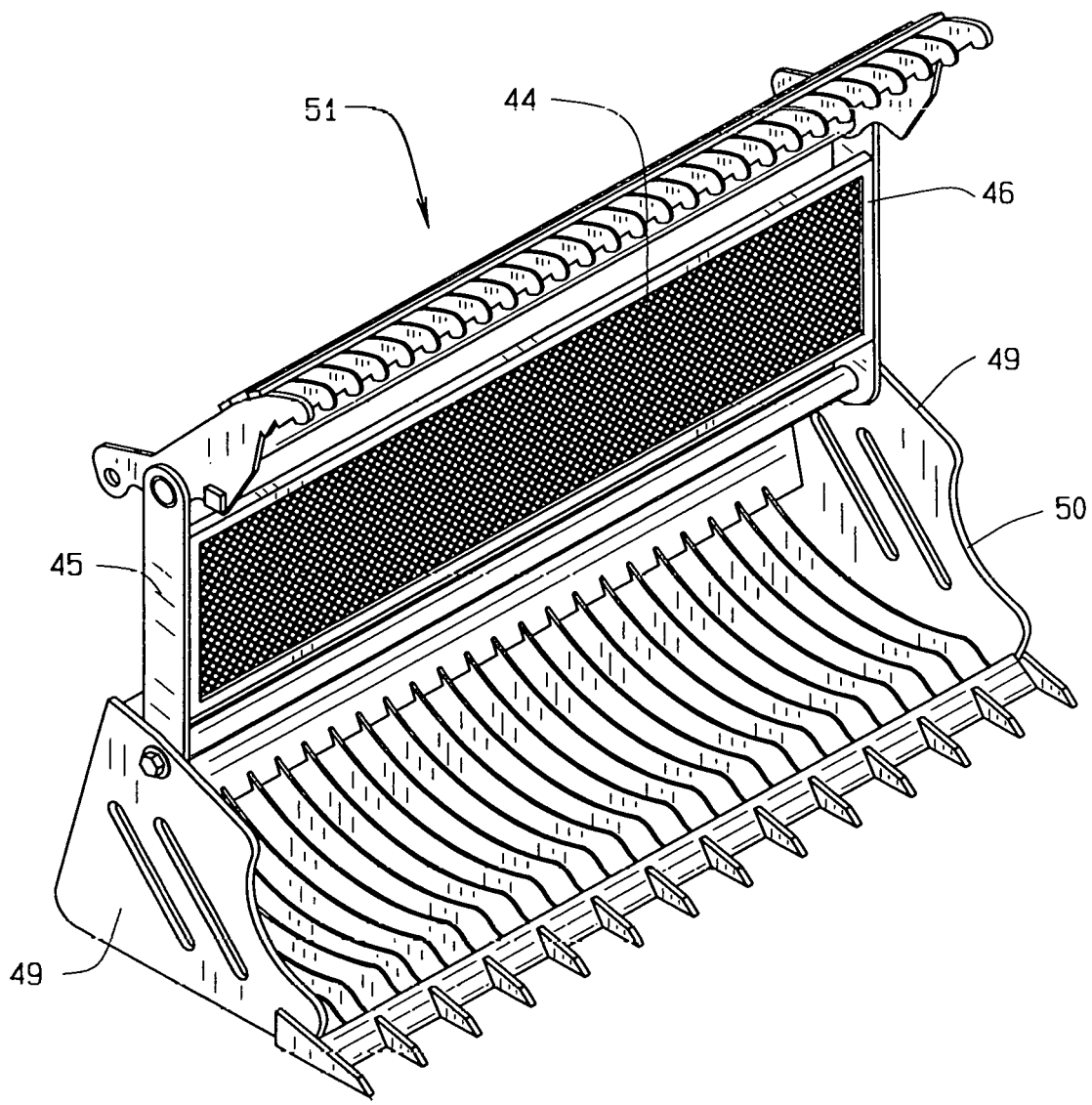
FIG. 10 shows a grapple top wall formed of foraminous material.

A further modification to the structure of this invention may be seen in FIG. 10. As noted, there may be a top wall 44 provided between the lever arms 45 and 46, and this top wall may be formed of a strong foraminous material, such as heavy wire screen, or the like, as noted at 47. This is to prevent any rock or debris from flying up, and hitting the operator of the skid steer, as can be understood. In addition, the side walls 48 and 49 may be cut along an arcuate shape, as noted at 50, so that when a large log or tree stump is to be removed, as noted in FIG. 9, the stump that locates within that arcuateness 50 of the side walls, may be in that position by means of the grapple 51, as can be noted. These are examples of modifications to the subject matter of this invention that may be made to its structure, to facilitate its usage and application for a variety of debris moving purposes.

In addition, there may be a plurality of hydraulic cylinders arranged within the structure of the device, and perhaps a pair of spring means, as at 52, to achieve the degree of force as necessary to undertake that compound motion for the grapple, relative to its bucket, when handling large rocks, boulders, tree stumps, or the like. These are just examples of variations that can be made to the subject matter of the invention, to still obtain the spirit of its functionality, in handling heavy debris type items, during usage and application.

For example, the hydraulic hoses that may interconnect with the hydraulic cylinders of this invention may be run through the various structural tubings, such as the square tubings 13 and 14, on any of the cross bars, in order to shelter the hoses from exposure to the elements, to protect the hoses, and contribute to better operator visibility, when operating the skid steer, and the bucket and grapple of this invention. In addition, the spacing between the various bars, such as the bars 3, or the tines 41, will be made to that spacing that will allow smaller rocks to fall therethrough, at the preference of the customer, since it may not be necessary to remove every last element of debris, such as small rocks, from the field, when operating this attachment. Hence, when the operator fills up the bucket with debris, and lifts the bucket upwardly, and tilts it rearwardly, this makes the rocks and dirt roll to the back of the bucket, and that action allows the dirt to shift down and exit from the bucket and back onto the ground, particularly when smaller debris is involved.

This invention allows for the sweep-in action of the grapple, to assist in getting rocks into the bucket with minimal dirt, and when closed, presents a screened barrier across the front of the rock bucket, and prevents the larger rocks from sliding off of the same, during conveyance. The operator can tilt the bucket forwardly, and again backwardly, and allow the smaller dirt and rocks to fall through the blades or tines, agitating the same in this manner to attain their removal. Obviously, the bucket of this invention may have various dimensions, and can be made as small as four feet wide, or even six to seven feet wide, or more, depending upon the carrying capacity required by the user. Or, a pair of grapples may be arranged side by side, to provide for two independent sweep-in maneuvers by the operator, when sweeping debris and rocks into the associated bucket.

There are various stops that are included within the structure of the device, such as can be seen in FIGS. 4 and 5, where the lever arm 29, and its associated arm 30, at their back end, have a stop surface 44, which when the lever arm is pivoted forwardly, from its upward position, to its forwardly extending horizontal position, as noted in FIG. 5, the stop 44 will encounter the cross tube 13, and prevent further pivot of the lever arms 29, etc, as the hydraulic cylinder is actuated. Then, when the hydraulic cylinder continues to extend, under pressure, as previously explained, the side arms 19 and 20 have a stop means 45 which encounter their respective lever arms 29 and 30, when the hydraulic cylinder pivots the side arms 19 to their fullest extent, as can be seen in FIG. 6. When this occurs, the stops 45 engage the bottom of the lever arms 29 and 30, and prevent any further pivot to the rake 15, when the hydraulic cylinder is fully extended, as can be noted in FIG. 6. When this stop occurs, the rake will have already pushed all of the debris into the bucket 2, as previously explained.

Figure 11:
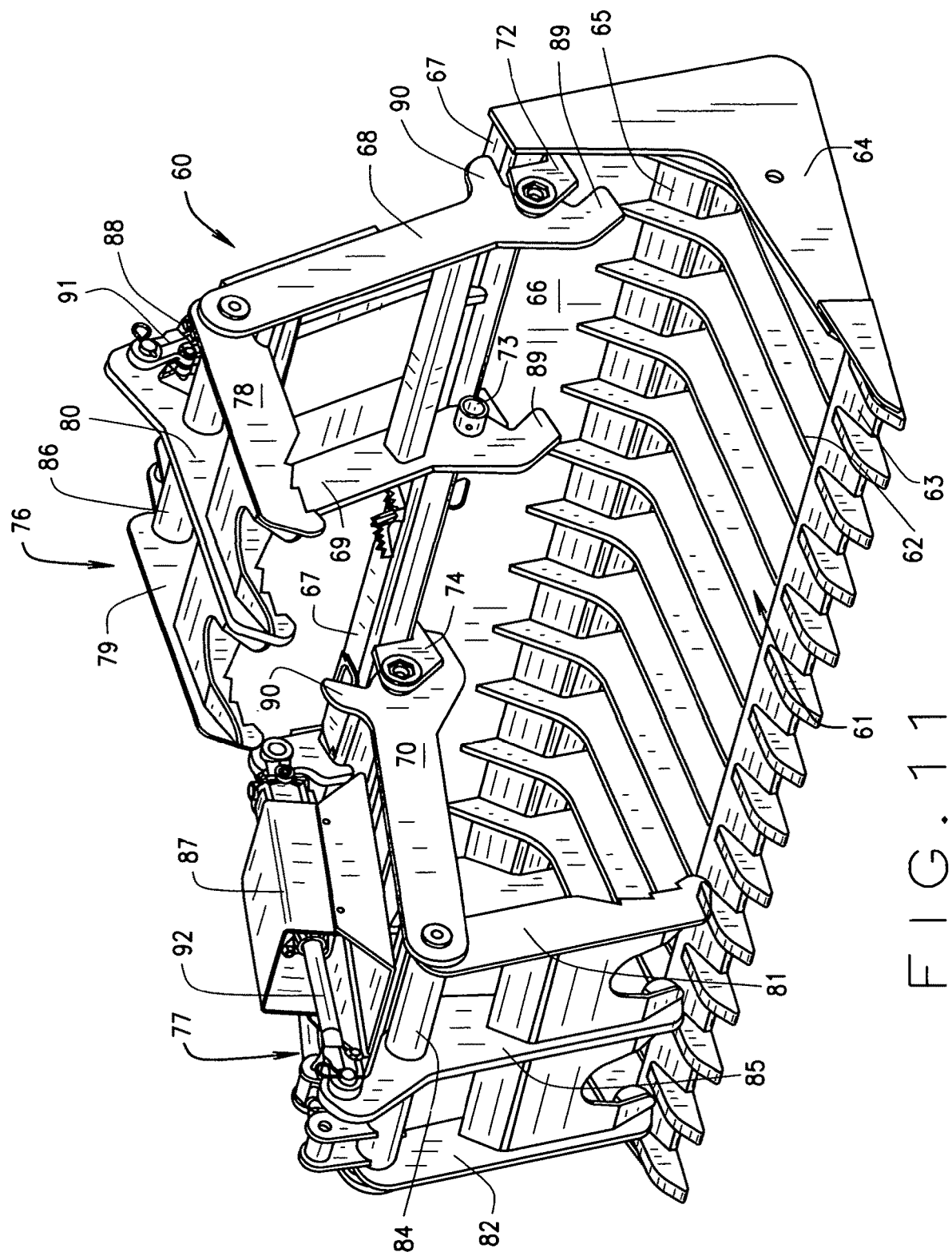
FIG. 11 provides an isometric view of the rock bucket attachment incorporating only a partial of one or more grapple sections, the left one shown closed during pick up of debris, while the right section is elevated, during application for use for the pick up of miscellaneous debris.
Figure 12:
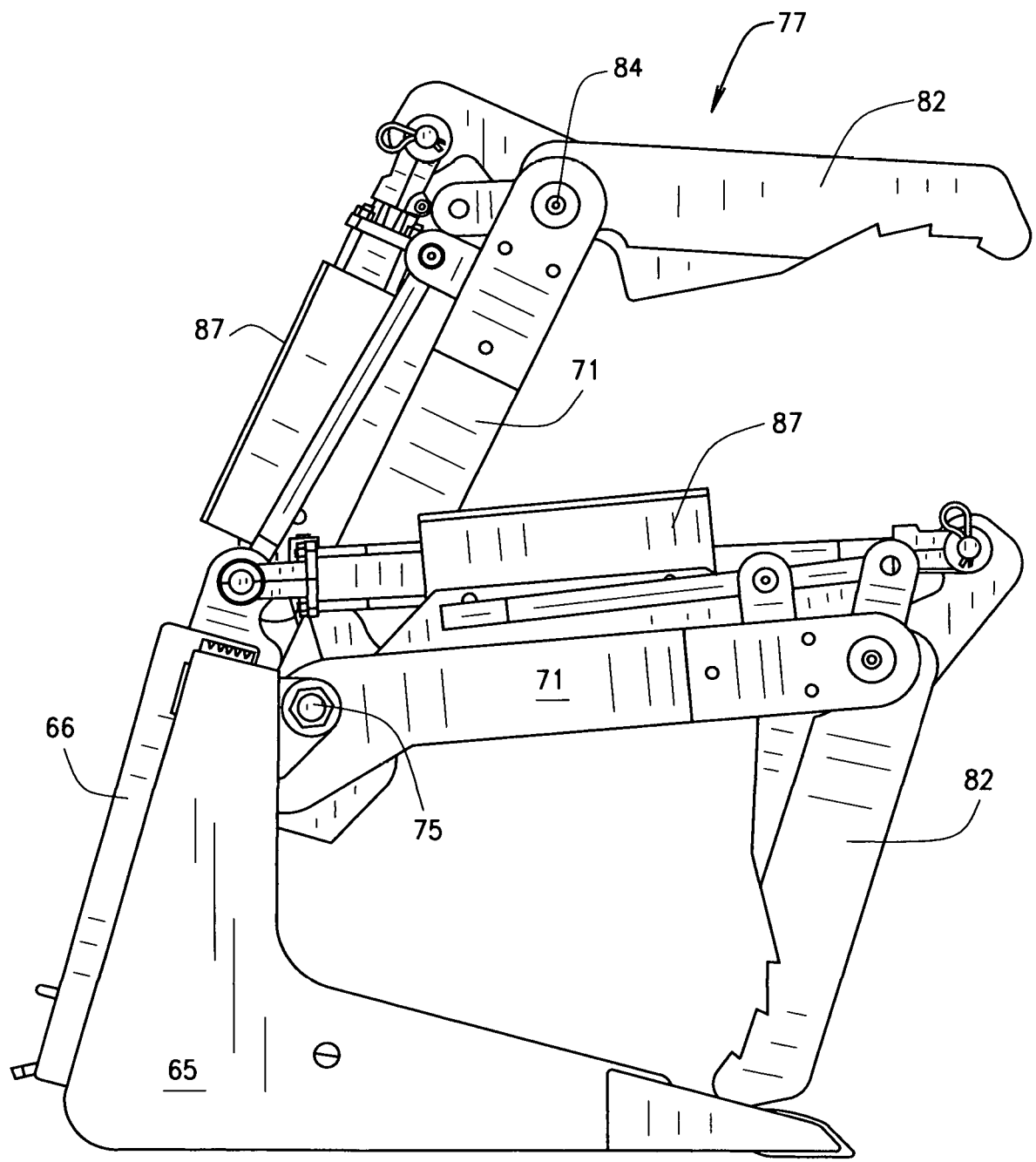
FIG. 12 is a side view of the bucket and its grapples, one being pivoted fully forwardly, during pick up, while the other section is elevated, in preparation for a pick up of debris.

In referring to FIG. 11, therein as shown the rock bucket 60, which is generally of the same configuration and shape, structurally, as the bucket as shown and explained with respect to FIG. 1. In this instance, it includes its bucket portion 61, also formed of a series of bars, rails, tines, or the like, as shown at 62, which are held together by its cross bar 63, which extends between a pair of side walls, one as shown at 64. A back frame 65 secures the back end of the bars in position, and the back frame is integrated with the back wall 66 for the device. An upper structured frame 67 secures between the side walls 64 and 65 as can be noted in FIG. 12. The back wall 66 is also disclosed therein.

There are a series of side arms 68 through 71 that secure with specific pivot mounts, generally as shown at 72 through 75, and these pivot mounts are secured to the upper frame 67, as previously reviewed.

In this particular instance, the pivot mounts secure a pair of grapples 76 and 77, for functioning within the structure of the rock bucket attachment, as previously reviewed in this specification, for functioning for moving, grabbing, lifting onto the bucket 61, of any trash of the type of debris as previously explained. Furthermore, in this instance, while there are two such grapples 76 and 77 shown, there could just as easily be three, or more, or just a singular grapple, as previously reviewed in this application.

Each of the grapples include side arms, as can be seen at 78 and 79, with respect to the grapple 76, and further has a centered arm 80 as noted.

The grapple 77 also includes a pair of side arms 81 and 82, that pivotally mount to the front of the respective lever arms 70 and 71, held in its structured position, for pivoting, by means of the pivot bar 83, as can be noted. A centered arm 85 is structurally connected intermediate thereof, and is likewise secured to the pivot rod 84, as noted.

A similar type of pivotal rod 86 secures the back end of the various side arm 78 and 79, and the center arm 80, in position for pivotal movement relative to its lever arms 68 and 69, for pivotal movement relative thereto, with respect to the grapple 76.

It can be seen that each of the grapples 76 and 77 have at least one hydraulic cylinder, as at 87, with respect to the grapple 77, and the hydraulic cylinder 88, with respect to the grapple 76.

Once again, the various lever arms 68 through 71, at their back ends, have the formed integral stops, as at 89 and 90, so as to limit the extent of pivot to their arms between an elevated position, as noted with respect to the grapple 76, and at the lowered grasping position, as can be seen with respect to the grapple 77.

The various hydraulic cylinders 87 and 88 function similarly to the hydraulic cylinders previously described, and can extend their respective cylinder rods 91 and 92 to the fullest extent forwardly, for pivoting both the lever arms, and the side arms of each grapple, fully forwardly and downwardly, as can be seen with respect to the grapple 77, or the hydraulic cylinder may retract its cylinder rod, as at 91, for withdrawing the grapple 76, and its associated side arms and lever arms upwardly, as when it has completed a grapple operation, for removal of debris, and to maintain the grapple, as at 76, in an idol and non usable position.

Other than the foregoing, wherein this grapple bucket incorporates a pair of separate grapples, within the same bucket structure, the structure, functionality, and usage of the grapple bucket of this modified design, is of similar and related structure to that singular one as previously described. And, as stated, there may be even more grapples associated with the grapple bucket, such as three or more, depending upon the need of the sweep-action grapple by the particular customer involved. To give an idea as to relative size, a grapple bucket of these designs may be anywhere from having a 72 inch width, or even narrower, and even up to 78 and 84 inch models or even of greater design, depending upon the customer's selection.

Variations or modifications to the subject matter of this invention may occur to those skilled in the art upon review of the disclosure as provided herein. Such variations, if within the spirit of this invention, are intended to be encompassed within the scope of any claims to patent protection issuing herein. The description of the invention in the preferred embodiment, and its disclosure in the drawings, are primarily set forth for illustrative purposes only.

We claim:

1. A rock bucket attachment incorporating sweep-in grapple for pick up and conveying of miscellaneous debris, including rocks, boulders, trees, and other debris, comprising:
    a bucket, said bucket having a pair of side walls, a back wall attaching with said side walls, and a bottom wall formed connecting with the approximate bottom of said back wall and located at its sides proximate the bottom of said side walls, and a cross bar connecting between the lower front of the side walls and securing the front of the bottom wall therewith, an upper frame connecting between the approximate upper back of said side walls;
    at least a pair of grapples, each grapple provided for compound pivoting, and each grapple incorporating a pair of spaced apart side arms, and said bottom wall formed as a structural rake provided affixed between said pair of side walls, and a pair of lever arms, said lever arms pivotally connecting with the side arms, the opposite back end of each lever arm pivotally connecting with the approximate upper back of each side wall, or upper frame of the back wall, at least one hydraulic cylinder interconnecting to the upper portion of each grapple between the lever arms, said hydraulic cylinder incorporating a cylinder rod, and said cylinder rod pivotally connecting to the structural rake and which when actuated provided for compound movement of the structural rake, its lever arms, and its side arms initially forwardly, and then pivoting said side arms and rake pivotally downwardly for sweeping debris into the formed bucket, so that when the hydraulic cylinder is actuated, it pivots its grapple with the rake forwardly, and then upon further actuation of the hydraulic cylinder pivoting the structured rake of the grapple in a downward pivot and into contiguity with the front of the bottom wall of the bucket to rake in and pick up any rock or other debris from the surface of the ground, a spring means provided connecting centrally of each grapple to counterbalance the operations of the hydraulic cylinder used to pivot the grapple in their compound movements, and the return of said grapple back to its upright position, at least one of said lever arms of each grapple having a stop portion at its back end, and said stop portion provided for engaging the upper frame of the back wall during forward movement of said grapple to curtail further pivot of said lever arms during actuation of its associated cylinder, and said hydraulic cylinder further pivoting its side arms and the rake of the grapple downwardly into contiguity with the front of the bottom wall of the bucket during operation.

2. The rock bucket attachment of claim 1, wherein there a pair of grapples pivotally connecting with the side walls or upper frame of the back wall of the bucket, and each grapple capable of independent actuation and compound pivoting through their respective hydraulic cylinders for pivoting of the structured rake of the grapple for pick up of debris from the surface of the ground.

3. The rock bucket attachment of claim 2, and including a first cross rod interconnecting between the approximate front of the pair of lever arms of each grapple, and a pair of pivot mounts securing for pivotal movement of the lever arms of each grapple to provide for the pivotal movement of the grapple during its actuation.

4. The rock bucket attachment of claim 3, and including a stop structure provided upon at least one of said side arms, and disposed for engaging an associated lever arm to curtail further pivot of the rake as it comes into contiguity with the front end of the bucket bottom upon sweeping of debris into the bucket during application.

5. The rock bucket attachment of claim 2, wherein said bottom wall is formed of a series of substantially parallel arranged bars, provided between the bucket side walls, and provided for holding debris raked onto the bucket during application.

6. The rock bucket attachment of claim 2, wherein the bottom wall being formed of a series of tubular tines, parallel arranged and spaced apart, located between the side walls of the bucket, and provided for supporting any debris raked onto the bucket during application.

7. The rock bucket attachment of claim 2, wherein the spaced apart side walls are of concave shape to provide clearance for retaining of any debris raked into the bucket during operations of the attachment during downward pivot of the rake of the grapple to urge said rake to move any debris onto said attachment bucket.

8. The rock bucket attachment of claim 2, including a top wall provided between each pair of lever arms of each grapple to prevent any debris from being projected upwardly during operations of the bucket attachment.

9. The rock bucket attachment of claim 8, wherein the formed top wall is of a foraminous design.

10. The rock bucket attachment of claim 8, wherein the hydraulic cylinder operatively associated with each grapple being mounted onto the approximate center of the top wall of its grapple.

11. The rock bucket attachment of claim 2, wherein there are two or more grapples operatively associated with the bucket of the rock bucket attachment.

* * * * *